(12) United States Patent
Hsu et al.

(10) Patent No.: US 7,088,730 B2
(45) Date of Patent: Aug. 8, 2006

(54) ETHERNET SWITCHING ARCHITECTURE AND DYNAMIC MEMORY ALLOCATION METHOD FOR THE SAME

(75) Inventors: Meng-chi Hsu, Hsinchu (TW); Wei-ren Lo, Hsinchu (TW)

(73) Assignee: ADMtek Incorporated (TW)

( * ) Notice: Subject to any disclaimer, the term of this patent is extended or adjusted under 35 U.S.C. 154(b) by 1003 days.

(21) Appl. No.: 10/150,252

(22) Filed: May 15, 2002

(65) Prior Publication Data

US 2003/0147410 A1    Aug. 7, 2003

(30) Foreign Application Priority Data

Feb. 1, 2002    (TW)    ................................ 91101859 A

(51) Int. Cl.
*H04L 12/28*    (2006.01)
(52) U.S. Cl. ...................... 370/412; 370/474
(58) Field of Classification Search ................ 370/412, 370/474, 229, 371, 378, 381, 383, 384, 413, 370/417, 428, 429, 230.1, 235
See application file for complete search history.

(56) References Cited

U.S. PATENT DOCUMENTS 6,456,590 B1 *    9/2002   Ren et al. ................... 370/229

* cited by examiner

*Primary Examiner*—Chi Pham
*Assistant Examiner*—Alexander O. Boakye
(74) *Attorney, Agent, or Firm*—Martine Penilla & Gencarella, LLP

(57) ABSTRACT

This invention discloses a dynamic memory allocation method for an Ethernet switching architecture, which can resolve problems with the limitations of transmission bandwidths and transmission port counts in a conventional network packet switching. The method comprises steps of providing a plurality of input ports and output ports, providing a shared memory for storing packet segments of a plurality of packets, providing a first link RAM (Random Access Memory) for controlling a making and reading of a single linked list for the packet segments of each the plurality of packets, and providing a second link RAM serving as a FIFO (first in first out) device for co-managing an obtaining of the link address spaces at the corresponding input ports before the single linked list been made, and a releasing of the link address spaces at the corresponding output ports after the single linked list been read.

26 Claims, 7 Drawing Sheets

ETHERNET SWITCHING ARCHITECTURE AND DYNAMIC MEMORY ALLOCATION METHOD FOR THE SAME

BACKGROUND OF THE INVENTION

1. Field of the Invention

The present invention relates to a method for dynamically allocate memories in an Ethernet switching architecture. More specifically this invention relates to an Ethernet switching architecture provided with an optimized single linked list for dynamically allocate a shared memory through a free-link RAM during the packet receiving & transmitting process, in order to achieve the object of improving the transmission bandwidth of network switching.

2. Description of the Related Art

A shared memory architecture is one that uses a single common memory as a switching device for network packets between the input ports and output ports. Through the path of data receiving of an input port, a received packet can be stored on the shared memory and can be assigned and transmitted to the path of data transmitting of an appropriate output port. And it is often used as a main structure for LAN (Local Area Network) switching because of the advantages of lowering cost, simplifying design requirements, and enabling easy implementation.

A shared memory may be divided into a plurality of contiguous data buffers that each has a fixed-length of 2k bytes and used as a FIFO device to store the received packets from a plurality of input ports and to transmit the received packets to an appropriate output port. This is simple for hardware configuration, however, the length of the received packet could be considerably smaller than the fixed length and the usage efficiency would dramatically reduced.

To solve this problem, a shared memory is often configured as a plurality blocks of discontiguous data buffers with a fixed length of 256 bytes to store the received packet segments from a plurality of input ports. After the plurality of packet segments have been received from the input ports, the shared memory would then assign the free data buffers to the plurality of packet segments. At the mean time, a link RAM mapping to the shared memory would store the corresponding link addresses and a linked list of the block addresses of the plurality of packet segments. According to the block addresses, the corresponding link addresses, and the designated output ports of the plurality of packet segments, the plurality of packet segments will be inserted to a corresponding output queue of an appropriate output port. Here, the output queue represents the stream of packets waiting in the path of data transmitting to be transmitted to a corresponding output port.

FIG. 1 is a diagram simplified illustrating a conventional Ethernet switching architecture. As shown in the diagram, a shared memory 10 is configured to have a plurality of blocking data buffers 11 with same size. The shared memory consists of a free-buffer pool 12 and a plurality of assigned buffers 13. The free-buffer pool 12 stores blank blocks to be assigned to the packet segments 21 waiting to be received, and those been released from the plurality of assigned buffers 13 after the packet segments have been read. And the plurality of assigned buffers 13 store packet segments received from the plurality of input ports 20. Additionally, the number of link address spaces 31 on a link RAM 30 is configured to be the same as the block counts on the shared memory 10. The link addresses 33 and the block addresses 14 of the shared memory 10 are in a mapping relation 15.

For instance, the link addresses of a linked list 34 for the six packet segments of a received packet are #4, 6, 8, 9, 13 and 14 in FIG. 1. And the six packet segments are stored on the shared memory 10 with its mapping block addresses 14 at &50, 70, 90, 100, 110 and 140 respectively. The final link address #14 will be linked to the link address #10 of the first packet segment of a next received packet. As a result, a flag 35 representing the link address #14 pointing to the link address #10 will be assigned. The assigning also indicate that the corresponding block of the link address #14 stores the last packet segment of the received packet. On the other hand, the link addresses #0, 7, 11, 12, 15, 3 and 5 of a linked list 36, illustrated by a broken line on the link RAM 30 in FIG. 1, represents the released link address spaces of the previous packets been read. And to which the blank blocks &5, 15, 25, 35, 45, 55, and 65 in the free-buffer pool 12 on the shared memory 10 are respectively corresponded. These released link address spaces are available for link use of the packet segments of the next received packet. And the corresponding blank blocks are available for storage of the packet segments of the next received packet. In an unicast situation, a packet is transmitted to a designated output port. At this point, each packet segment of a packet is inserted to an appropriate output queue 37 according to its designated output port 40 with reference of the linked list 34 in order to achieve the object of transmitting the packet from the output port 40.

There are four steps to be sequentially carried out on the link RAM during the receiving to transmission of several packet segments of a packet. The first step is to get link. That is to assign the unused blocking data buffers of a shared memory to the plurality of packet segments and determine the corresponding link address spaces on the link RAM. The second step is to make link. That is to make the link addresses of the plurality of packet segments linked to form a linked list. The third step is to read link, which is to read the linked list. And the fourth step is to release link. That is to release the corresponding link address spaces after the linked list has been read. The following descriptions will further explain the process regarding to the receiving and transmission aspects, separately.

From aspect of the receiving, the packet segments of a packet firstly get link address spaces 31 that are available through an input port 20 and then the packet segments are written in. Then a linked list 34 is made and inserted to an output queue 37 to complete a receiving of the packet segments. FIG. 2 is a flow chart illustrating one example of the controlling process in receiving a packet according to the conventional Ethernet switching architecture described in FIG. 1. Listed below are the descriptions of the controlling steps with reference to FIG. 1.

Step 201: To get six link address spaces. That is, an input port 20 judges whether the number of link address spaces available for use on the link RAM 30 is less than six. Keep getting link address spaces while the number is less than six; otherwise go to Step 202.

Step 202: To judge whether there is a packet to be received by the input port. Yes then go to Step 203, otherwise go to End.

Step 203: To receive packet. Start writing the packet into the first block of the mapping blocks (e.g. the blocks &50, 70, 90, 100, 140, and 150 in FIG. 1) on the shared memory 10 of the obtained six link address spaces (e.g. #4, 6, 8, 9, 13, and 14 in FIG. 1).

Step 204: To write in packet data. That is to write in the packet data according to the current link addresses 33 (e.g. #4, 6, 8, 9, 13 and 14 on FIG. 1) and the link on the link RAM 30 of the packet segments 21 of the packet, and the mapping block addresses 14 on the shared memory 10.

Step 205: To judge whether a packet has been completed written. Yes then go to Step 208, otherwise go to Step 206.

Step 206: To judge whether a block has been completed written. Yes then go to Step 207, otherwise proceed the next address writing on the shared memory 10 and go back to Step 204.

Step 207: Proceed to linking, loop back to Step 204 and proceed to the next block writing. The proceeding to linking comprises: Assign only the next link address to the current link address and no further linking when the block just been written in is doing the first link. Assign the next link address to the current link address and link the current link address to the previous link address when the block just been written in is not doing a first link.

Step 208: To judge whether the packet is a good packet. Yes then go to Step 209; otherwise reject to receive the packet, release the link address spaces 31 on the link RAM 30 for a next packet to be received, and loop back to Step 202.

Step 209: To judge whether there are enough buffers on an output port 40. Yes then go to Step 210; otherwise abandon the received packet, release the link address spaces 31 on the link RAM 30 for a next packet to be received, and loop back to Step 202.

Step 210: To judge whether the packet is the first packet destined to the output port 40. Yes then proceed to Step 212, otherwise go to Step 211.

Step 211: To make link. That is to insert the current linked list of the packet to the tail address 43 of the output port 40 and to write in the flag 35 of the final link address of the packet on the link RAM 30.

Step 212: To write in the flag of the final link address of the packet on the link RAM 30 and to inform the output port 40 the starting link address of the packet on the link RAM 30.

From aspect of the transmission, the block addresses of the packet segments are first read, and then respectively read the packet segments in turn and its linked list to complete the transmission of the packet segments. In the final, the corresponding link address spaces been read over are released. FIG. 3 is a flow chart illustrating one example of the controlling process in transmitting a packet according to the conventional Ethernet switching architecture described in FIG. 1. Listed below are the descriptions of the processing steps with reference to FIG. 1:

Step 220: An output port 40 judges whether there is a packet for transmission. Yes then proceeds to Step 221, No go to ends.

Step 221: To read the header address on the output queue. That is to read the header address 38 on the output queue37 of the output port 40 to get the first block address. In the meantime, proceed to the Step 222 and Step 223.

Step 222: To read links. That is to read the link addresses of the linked list 34 of the packet sequentially and proceed to Step 224.

Step 223: To read in packet data. That is to read in the packet data according to the current link addresses 33 of the packet on the link RAM 30, and the mapping block addresses 14 on the shared memory 10. Then jump to Step 227.

Step 224: To judge whether the link of the last block has been read. Yes then proceed to Step 225, otherwise loop back to Step 222.

Step 225: To judge whether there exists a next packet for transmission. Yes then proceed to Step 226, otherwise jump to Step 227.

Step 226: To load the address of the last block. That is to load the link address of the last block of the packet segments of the transmitting packet and use it as the header address for the next packet for transmission. Proceed to Step 227.

Step 227: To judge whether the packet for transmission either been completely read or abortively transmit. Yes then proceed to Step 228, otherwise keep on judging.

Step 228: To release link. That is to sequentially release the link address spaces 31 corresponding to the packet segments that have been read on the output port. Proceed to Step 229.

Step 229: To judge whether the entire link address spaces 31 on the link RAM 30 have been released. Yes then loop back to Step 220, otherwise back to Step 228.

As shown in FIG. 2 and FIG. 3, the four steps of getting link, making link, reading link and releasing link which the linked list of the packet get through are co-managed by only a link RAM 30 during the receiving to the transmission process. Owing to this, the time required for each packet from the receiving to transmission is the product of the time required to get through the four steps (4×clock period), the block counts and the transmission port counts used. In the 10/100 MB/s Ethernet switching, the bandwidth required might not be limited by the linked list method described above. However, in high speed Ethernet switching, under the demand of the transmission time for a packet to be smaller than 672 ns (that is, the bandwidth is 1 Gb/s and above), the transmission port counts that is proportional to the transmitting time of the packet would be limited.

Accordingly, methods for solving bandwidth problems have been proposed. And one is to shorten the time required for transmitting packet by increasing the clock frequency of the system and thus increasing the bandwidth. However, this will cause the power consuming and poor reliability problems. Therefore, finding a method that can obtain multiple ports and high bandwidth without increasing clock speed beyond the permissible range for Ethernet switching is very desirable.

SUMMARY OF THE INVENTION

One object of this invention is to solve the above-mentioned problems of the limitations in transmission bandwidth and transmission port counts for Ethernet switching. Another object of this invention is to provide a method for dynamically allocating memories in Ethernet switching architecture in order to increase transmission bandwidth for Ethernet switching and make it workable to increase transmission port counts.

A method for dynamically allocates memories in an Ethernet Switching architecture, comprising steps as follows. Providing a plurality of input ports and output ports for respectively receiving and transmitting packet segments of a plurality of packets; providing a dynamic random access memory as a shared memory to store the packet segments after been received from the plurality of input ports but before transmitted out from the plurality of output ports; providing a first link RAM mapping to the shared memory for controlling a making of a single linked list for the packet segments of each of the plurality of packets while writing the plurality of packets onto the shared memory, and for controlling a reading of the single linked list while reading the plurality of packets; and providing a second link RAM serving as a first in first out device for co-managing an obtaining of the link address spaces at the corresponding input port before the single linked list been made, and a releasing of the link address spaces at the corresponding output ports after the single linked list been read.

Through this method, the time required for the linking process can be reduced by half comparing to a conventional technique. Besides, the packet used a "single link address" to form a "single linked list" and write the entire block addresses of the packet segments onto the shared memory "in one single process". For this, when making and reading links, the time required is irrelevant to the allocated block counts on the shared memory. Consequently, the total packet transmission time is reduced to the product of two times the clock period and transmission port counts. Hence, without increasing the clock speed, not only a high bandwidth can be obtained, but also the transmission port counts can be increased at the same time.

DETAILED DESCRIPTION OF THE PREFERRED EMBODIMENT

Figure 1:
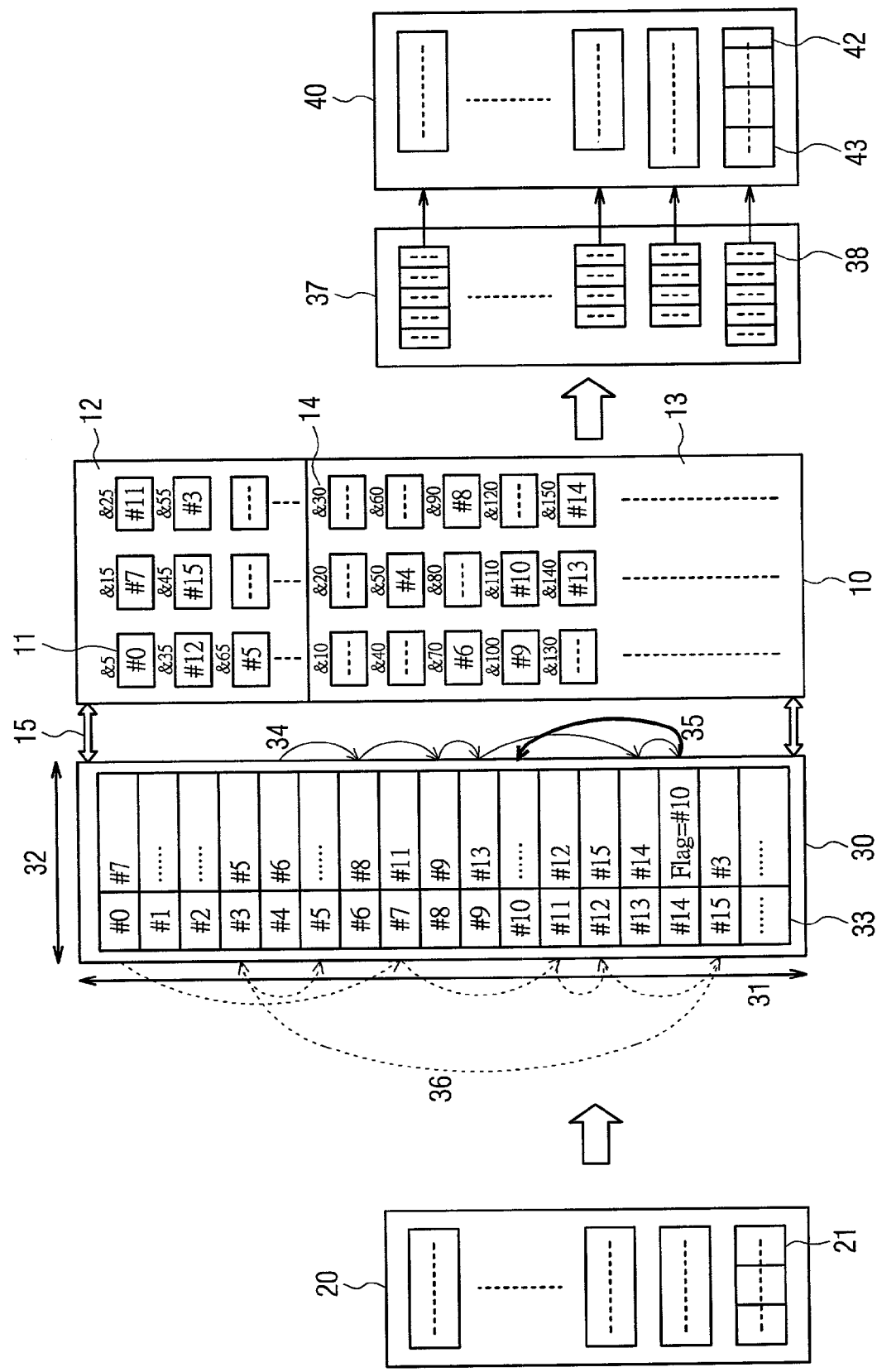
FIG. 1 is a diagram simplified illustrating a conventional Ethernet switching architecture.
Figure 2:
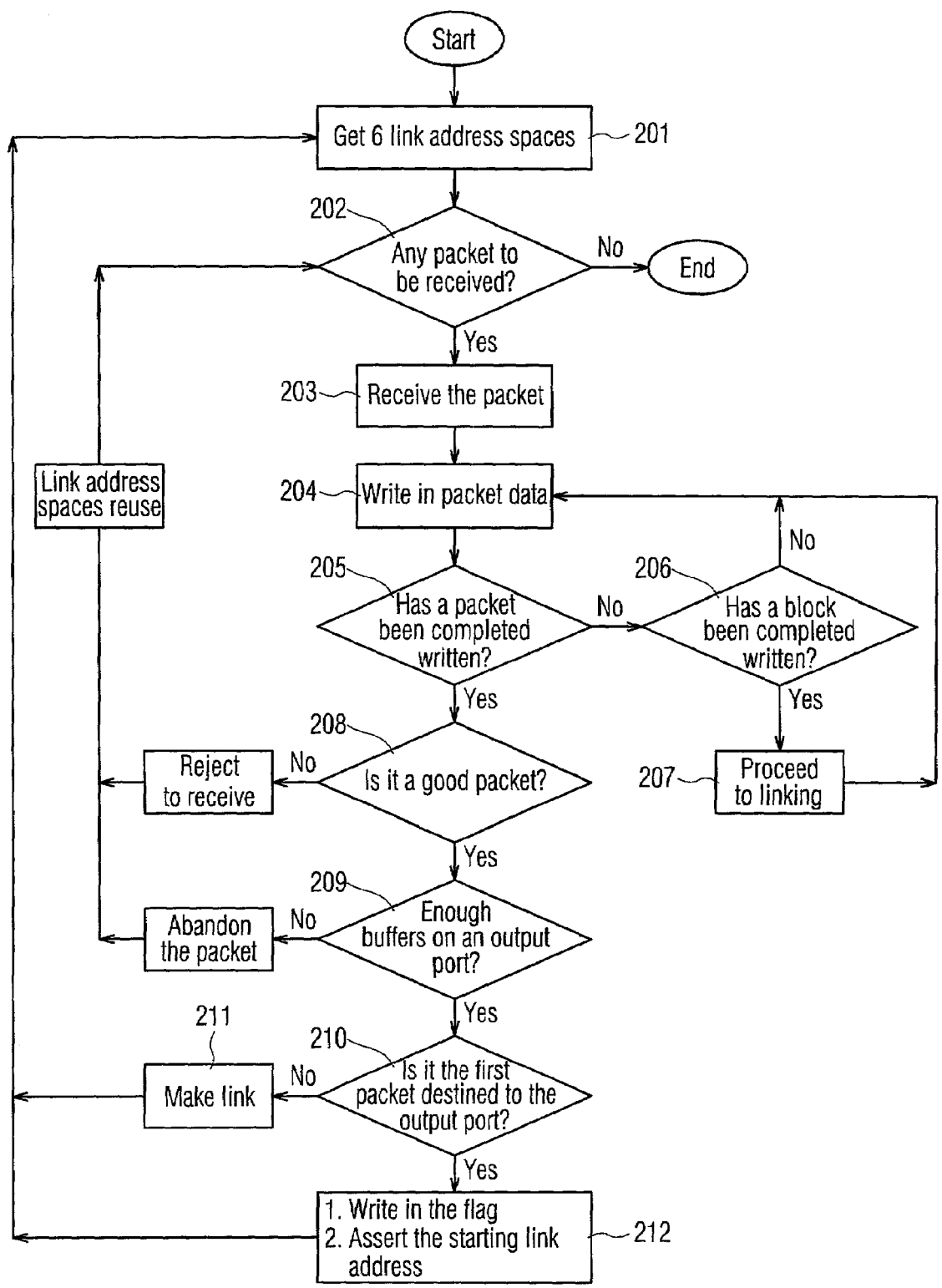
FIG. 2 is a flow chart illustrating one example of the controlling process in receiving a packet according to the conventional Ethernet switching architecture described in FIG. 1.
Figure 3:
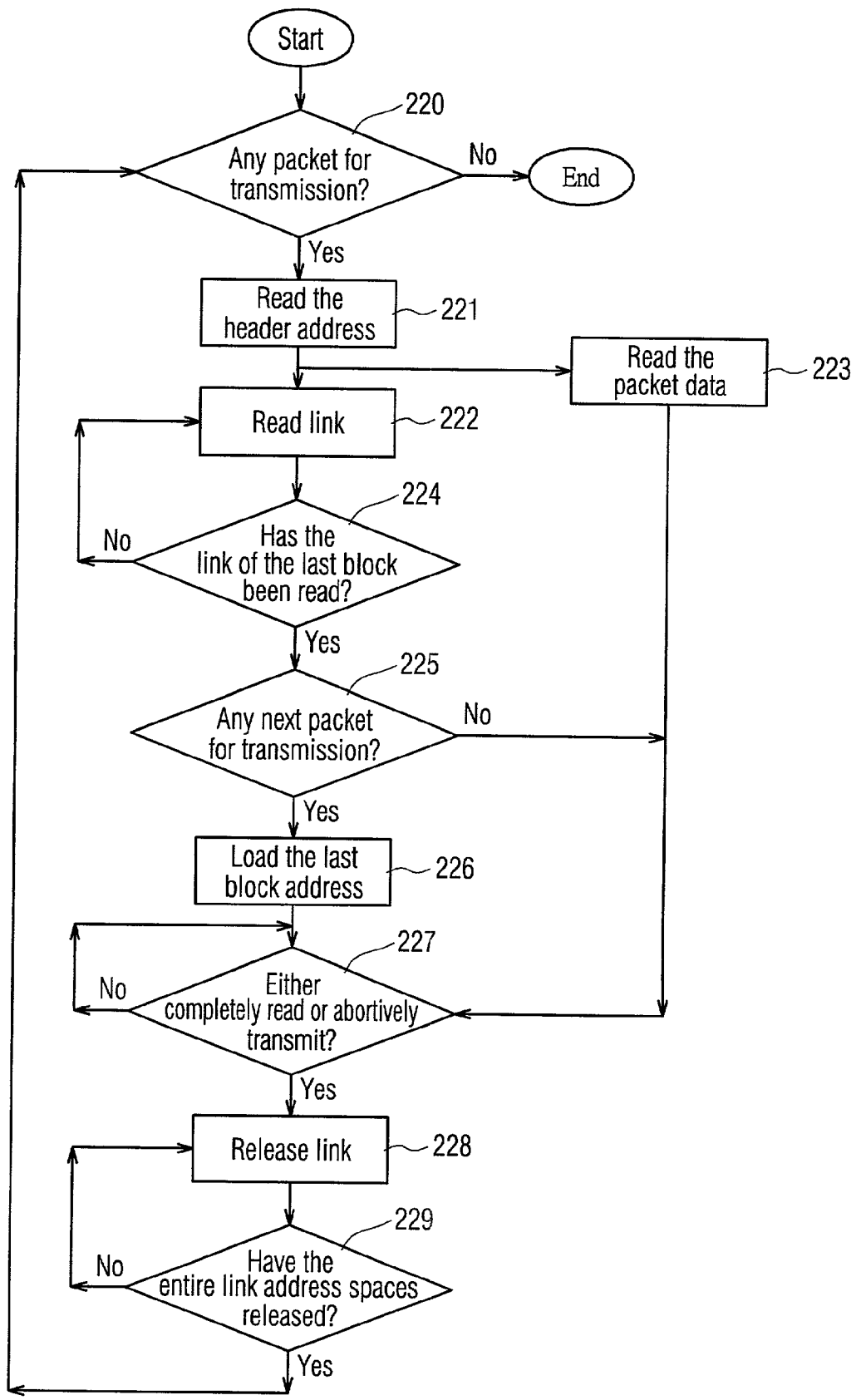
FIG. 3 is a flow chart illustrating one example of the controlling process in transmitting a packet according to the conventional Ethernet switching architecture described in FIG. 1.
Figure 4:
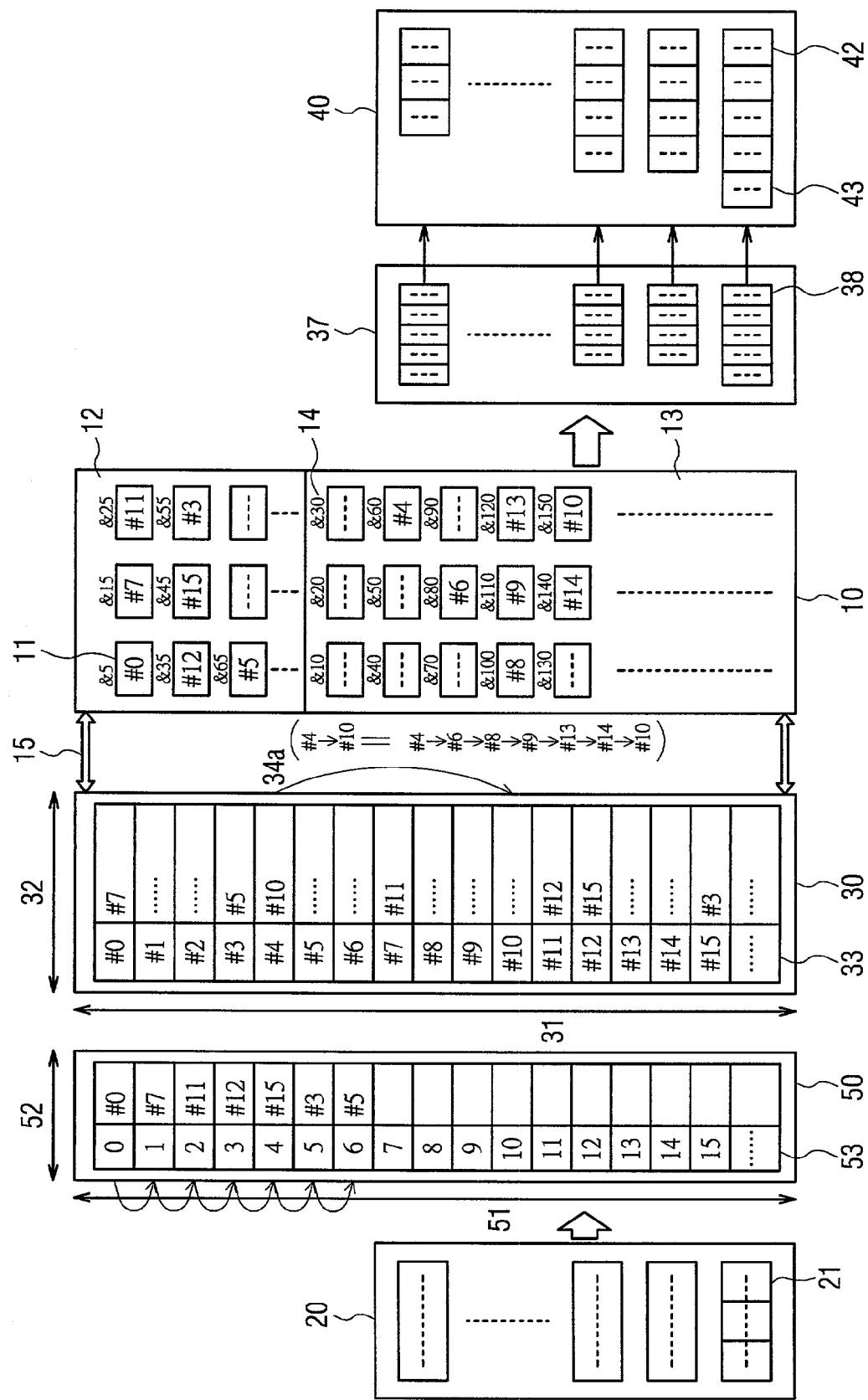
FIG. 4 is a schematic block diagram according to one embodiment of the present invention for an Ethernet switching architecture.

FIG. 4 is a schematic block diagram according to one embodiment of the present invention for an Ethernet switching architecture in which the same number is referring to the same component as in FIG. 1. Comparing to FIG. 1, the present invention provided with a free-link RAM 50 serving as a FIFO device and a preferred "single" linked list 34a. Among these, the number of free-link address spaces 51 on the free-link RAM 50 and the number on the link address spaces 31 of the link RAM 30 are both configured to be the same as the block counts on the shared memory 10. In addition, the free-link address width 52 of the free-link RAM 50 is smaller than the link address width 32 of the link RAM 30. As a result, an obtaining of the link address spaces before a linked list of a plurality of packet segments of a packet been made and a releasing of the link address spaces after the linked list been read can be co-managed.

For instance, the six packet segments of a received packet are stored on blocking data buffers of shared memory 10 at block addresses &60, 80, 100, 110, 120 and 140 separately. The corresponding link addresses are #4, 6, 8, 9, 13, and 14 respectively. In this embodiment, the first packet link address #4 of the received packet would linked to the link address #10 of the first packet segment of a next received packet "for once" due to the link addresses of the six packet segments are merely made and read in a "single process", and thus forms a single linked list 34a. On the other hand, when all packet segments have been read, the released link addresses #0, 7, 11, 12, 15, 3, and 5 would be managed in a fashion of first in first out sequence through the free-link RAM 50 for the next packet to be received. The corresponding blocking data buffers of the released link address are also released back to the free-buffer pool 12 on shared memory 10 for storing the next packet to be received.

Figure 5:
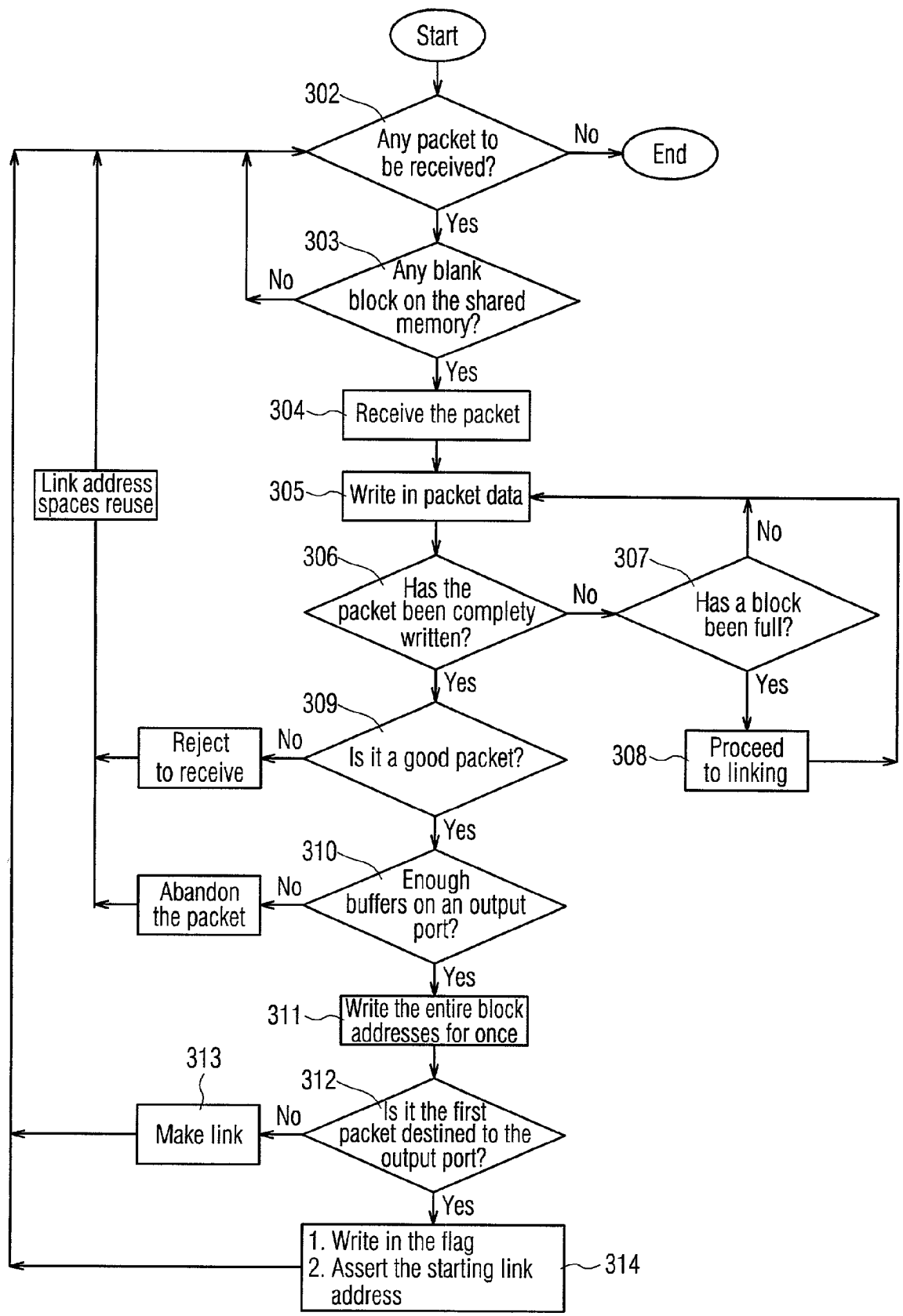
FIG. 5 is a controlling flow chart describing one example of making links in receiving a packet according to one embodiment of the present invention for an Ethernet switching architecture described in FIG. 4.
Figure 7:
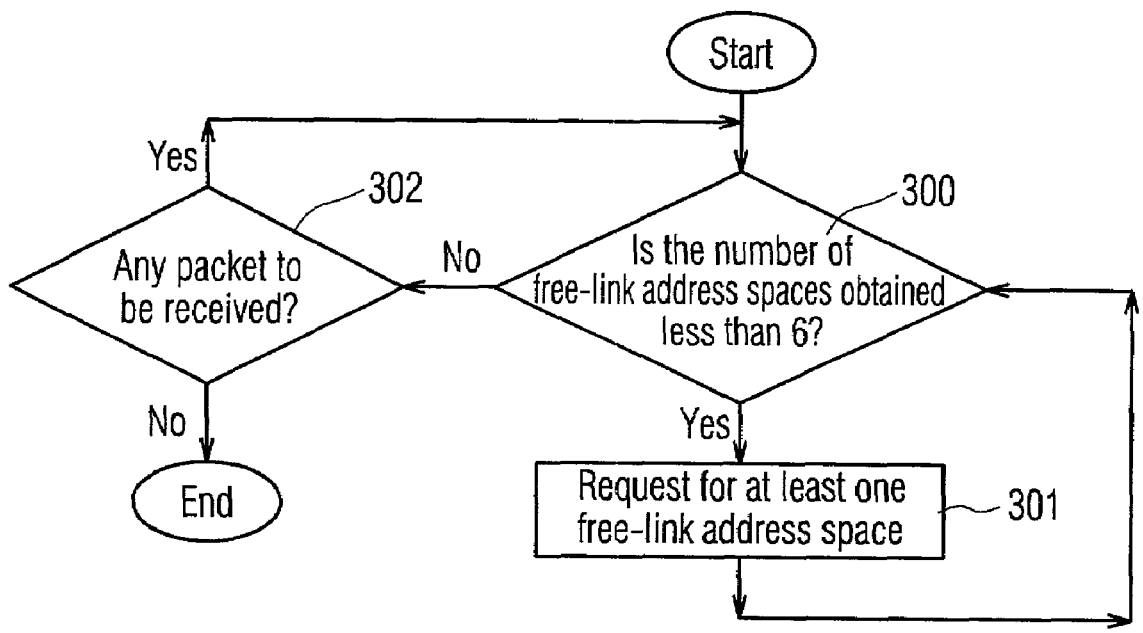
FIG. 7 is a controlling flow chart describing one example of getting links in FIG. 5 according to one embodiment of the present invention for an Ethernet switching architecture described in FIG. 4.

FIG. 5 is a controlling flow chart describing one example of making links in receiving a packet according to one embodiment of the present invention for an Ethernet switching architecture described in FIG. 4. And FIG. 7 is a controlling flow chart describing one example of getting links in FIG. 5 according to one embodiment of the present invention for an Ethernet switching architecture described in FIG. 4. Here, the control of getting links in the conventional technique is separated out and is under the charge of a free-link RAM 50. Therefore, with reference to FIG. 4, detailed steps for getting links and writing packets executed at the same time are described separately as below:

(Get Link, see FIG. 7)

Step 300: To judge whether the number of free-link address spaces 51 obtained for an input port 20 is less than six. Yes then proceed to Step 301; otherwise proceed to Step 302.

Step 301: The input port 20 request the free-link RAM 50 for at least one free-link address space 51. And loop back to Step 300.

Step 302: To judge whether there exists a packet to be received. Yes then go back to Step 300, otherwise go to end.

(Write Packet, see FIG. 5)

Step 302: To judge whether there exists a packet to be received. Yes then proceed to Step 303, No then go to end.

Step 303: To judge whether there exists at least one blank block on the shared memory 10 for the input port 20 to use. Yes then proceed to Step 304, No then abandon the packet receiving and loop back to Step 302.

Step 304: To receive packet. Immediately receive the packet and write the data into the blank block. And proceed to Step 305.

Step 305: To write in packet data. To write in the packet data according to the current link addresses 33 for the packet segments of the packet on the link RAM 30, and the mapping block addresses 14 of the packet on the shared memory 10. Proceed to Step 306.

Step 306: To judge whether the packet has been completely written in. Yes then jump to Step 309, No then go to Step 307.

Step 307: To judge whether a block has been full. Yes then proceed to Step 308, No then proceed to write according to the next address on the shared memory 10 and loop back to Step 305.

Step 308: Proceed linking. That is to assign the next link address to the current link address, to proceed to the next block writing on the shared memory 10, and loop back to Step 305.

Step 309: To judge whether the packet is a good packet. Yes then proceed to Step 310, No then reject the packet and release the link address space 31 on the free-link RAM 30 for the next packet waiting to be received and loop back to Step 302.

Step 310: To check whether the output port 40 has enough buffers. Yes then go to Step 311, No then abandon the packet receiving, release the link address spaces 31 on the free-link RAM 30 for the next packet waiting to be received, and loop back to Step 302.

Step 311: To write the entire block addresses 14 of the packet segments of the packet into blocking data buffers in the assigned buffer 13 on the shared memory 10 in a "single process" and proceed to Step 312.

Step 312: To judge whether the packet is the first packet for the designated output port 40. Yes then jump to Step 314, No then proceed to Step 313.

Step 313: To make links. That is to insert the single linked list 34a of the packet segments of the packet on the link RAM 30 to the tail address 43 of the output port 40.

Step 314: To write in the flag of the packet, and to inform the output port 40 the starting link address (e.g. #4) for the packet segments of the packet on the link RAM 30.

Figure 6:
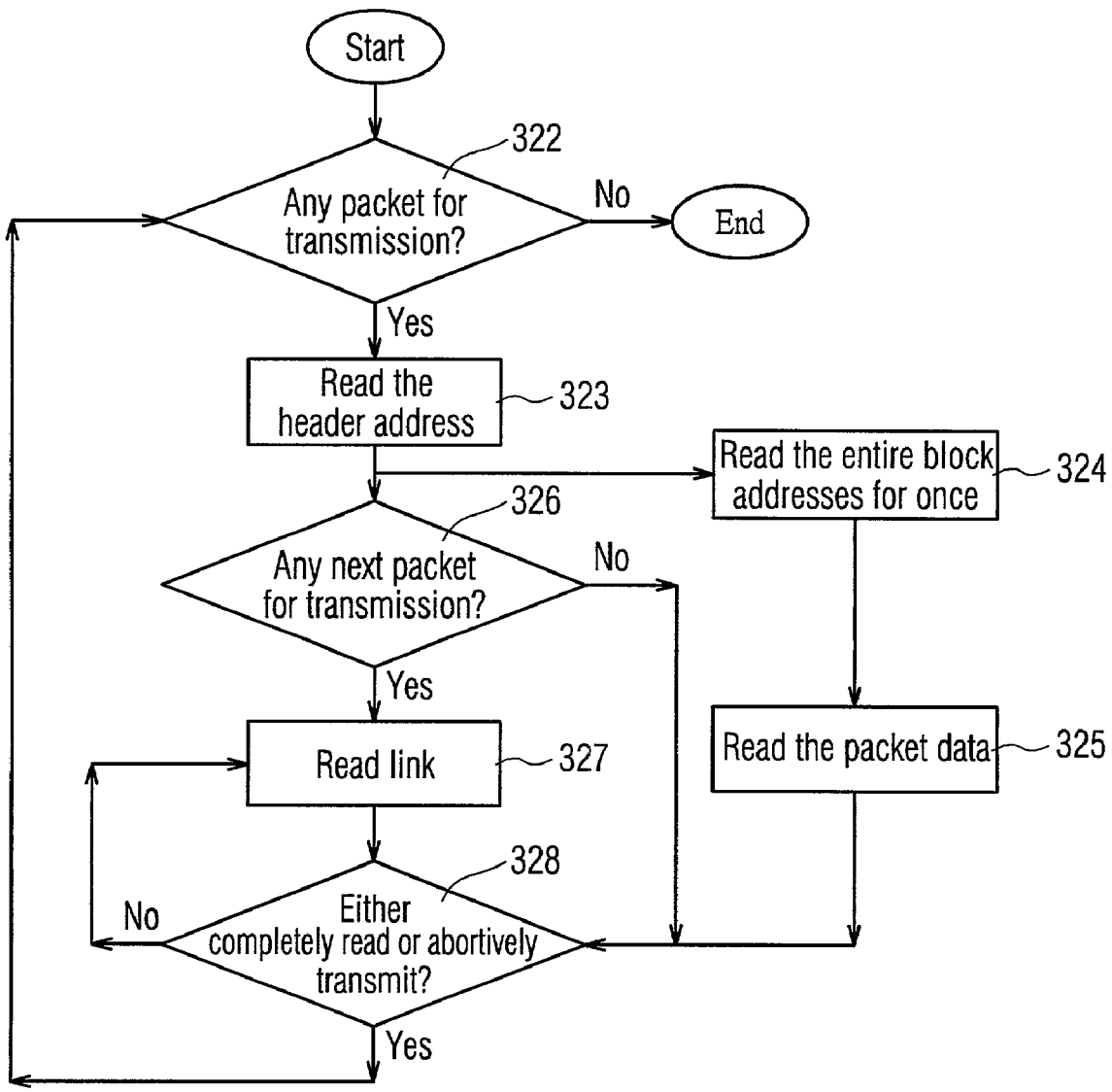
FIG. 6 is a controlling flow chart describing one example of reading links in transmitting a packet according to one embodiment of the present invention for an Ethernet switching architecture described in FIG. 4.
Figure 8:
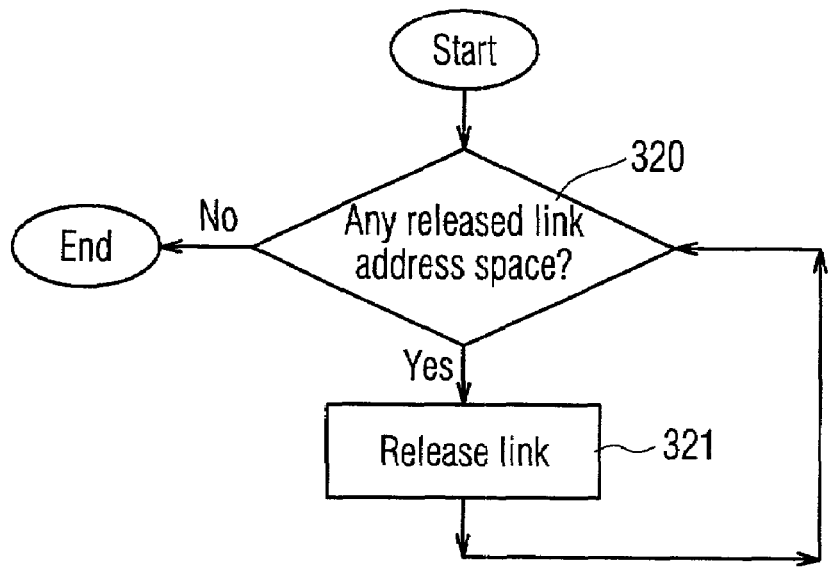
FIG. 8 is a controlling flow chart describing one example of releasing links in FIG. 6 according to one embodiment of the present invention for an Ethernet switching architecture described in FIG. 4.

FIG. 6 is a controlling flow chart describing one example of reading links in transmitting a packet according to one embodiment of the present invention for an Ethernet switching architecture in FIG. 4. FIG. 8 is a controlling flow chart describing one example of releasing links in FIG. 6 according to one embodiment of the present invention for an Ethernet switching architecture described in FIG. 4. Here, the control of releasing links in the, conventional technique is also separated out and is under the charged of the free-link RAM 50. With cross-reference to FIG. 4, detailed steps for releasing links and reading packets executed at the same time are described respectively as below:

(Releasing Link, see FIG. 8)

Step 320: To judge whether there is any link address space 31 been released on an output port 40 after reading a packet. Yes then proceed to Step 321, No then go to end.

Step 321: To release link. That is to insert the released link address space onto the tail address of the link address 53 sequentially in a manner of first in first out through the link RAM 50 for management.

(Reading Packet, see FIG. 6)

Step 322: To judge whether there exists a packet waiting for transmission. Yes then proceed to Step 323, No then go to end.

Step 323: To read the header address from the output queue. That is to read the header address 38 from the output queue 37 of the output port 40 for getting the link address of the first block. At the same time, proceed to Step 324 and Step 326 simultaneously.

Step 324: To read the entire block addresses 14 of the packet segments of the packet from the shared memory 10 in a "single process", and proceed to Step 325.

Step 325: To read packet data. That is to read the packet data according to the current link address of the packet on the link RAM 30, and the mapping block addresses 14 on the shared memory 10. Then jump to Step 328.

Step 326: To judge whether there is a next packet waiting for transmission. Yes then proceed to Step 327, No then jump to Step 328.

Step 327: To read links. That is to read the single linked list 34a of the packet and the linked list address table of the packet (for example, #4→#6→#8→#9→#13→#14→#10) on the link RAM 30. And which is served as a header address references for inserting the next packet waiting to be transmitted to the corresponding output queue 37. Then proceed to Step 328.

Step 328: To judge whether either the packet has been completely read or abortively transmit. Yes then go back to Step 322, No then keep on judging.

What is claimed is:

1. A method for dynamically allocates memories in an Ethernet Switching architecture, comprising steps of:
   Providing a plurality of input ports and output ports for respectively receiving and transmitting packet segments of a plurality of packets;
   Providing a dynamic random access memory as a shared memory to store the packet segments after been received from the plurality of input ports but before transmitted out from the plurality of output ports;
   Providing a first link RAM mapping to the shared memory for controlling a making of a single linked list for the packet segments of each of the plurality of packets while writing the plurality of packets onto the shared memory, and for controlling a reading of the single linked list while reading the plurality of packets; and
   Providing a second link RAM serving as a first in first out device for co-managing an obtaining of the link address spaces at the corresponding input port before the single linked list been made, and a releasing of the link address spaces at the corresponding output ports after the single linked list been read.

2. The method for dynamically allocates memories in an Ethernet Switching architecture according to claim 1, wherein the second link RAM is configured to have an address width no larger than that of the first link RAM.

3. The method for dynamically allocates memories in an Ethernet Switching architecture according to claim 1, wherein the shared memory is configured to have a plurality of blocking data buffers with same size, and the first link RAM and the second link RAM are configured respectively to have a plurality of link address spaces that are the same as the plurality of blocking data buffers in number.

4. The method for dynamically allocates memories in an Ethernet Switching architecture according to claim 3, wherein the size of the plurality of blocking data buffers is 256 bytes.

5. The method for dynamically allocates memories in an Ethernet Switching architecture according to claim 3, wherein one packet of the plurality of packets can fill a maximum of six blocks on the shared memory.

6. The method for dynamically allocates memories in an Ethernet Switching architecture according to claim 3, wherein for co-managing an obtaining of the link address spaces at the corresponding input port before the single linked list been made is to request the second link RAM for a free-link address spaces when the link address space counts is less than a fixed count;
   Wherein the fixed count is substantially the quotient of a maximum length of a packet to the size of the blocking data buffers; and
   Wherein the free-link address space is corresponding to a usable link address space of the first link RAM.

7. The method for dynamically allocates memories in an Ethernet Switching architecture according to claim 6, wherein the fixed count is 6.

8. The method for dynamically allocates memories in an Ethernet Switching architecture according to claim 3, wherein for controlling a making of a single linked list for the packet segments of each of the plurality of packets while writing the plurality of packets onto the shared memory comprising steps of:

To write in a packet data, comprising steps of:
  To request the shared memory for at least one blank block;
  Start to write with the first block requested on the shared memory;
  Write in data of the packet segments according to the packet size, the link addresses for the packet segments of the packet on the first link RAM, and the mapping block addresses for the packet segments on the shared memory; and
  Write the entire mapping block addresses of the packet segments onto the shared memory in a single process; and
  Making links when the packet is not the first packet for the designated output port, writing in the flag of the packet and inform the output port the starting link address for the packet segments of the packet on the first link RAM when the packet is the first packet for the designated output port.

9. The method for dynamically allocates memories in an Ethernet Switching architecture according to claim 8, wherein making links is to insert the single linked list of the packet segments to the tail address of the output port.

10. The method for dynamically allocates memories in an Ethernet Switching architecture according to claim 3, wherein for co-managing a releasing of the link address spaces at the corresponding output ports after the single linked list been read is to insert the link address spaces which have been completely read on the first link RAM to the tail address on the second link RAM in a manner of first in first out order through the second link RAM.

11. The method for dynamically allocates memories in an Ethernet Switching architecture according to claim 3, wherein for controlling a reading of the single linked list while reading the plurality of packets comprises steps of:
  To read a header address of an output queue of the corresponding output port for getting the link address of a first packet segment of a packet;
  To read the entire block addresses of the packet segments of the packet on the shared memory in a single process and simultaneously judge whether there is a next packet waiting for transmission;
  To read the packet data according to the current link addresses for the packet segments of the packet on the first link RAM, and the block addresses on the shared memory;
  To read the single linked list and linked list address table on the first link RAM for the entire packet segments when there exists a next packet waiting for transmission, so as to insert the next packet waiting for transmission to the header address of the output queue; and
  Proceed to read the next packet waiting for transmission when either the packet has been completely read or abortively transmit.

12. An Ethernet switching architecture, comprising:
  A plurality of input ports for receiving packet segments of a plurality of packets;
  A plurality of output ports for transmitting the packet segments;
  A shared memory being a dynamic random access memory for storing the packet segments after been received from the plurality of input ports but before transmitted out from the plurality of output ports;
  A first link RAM mapping to the shared memory for controlling a making of a single linked list for the packet segments of each the plurality of packets while writing the plurality of packets onto the shared memory, and for controlling a reading of the single linked list while reading the plurality of packets; and
  A second link RAM serving as a first in first out device for co-managing an obtaining of the link address spaces at the corresponding input ports before the single linked list been made, and a releasing of the link address spaces at the corresponding output ports after the single linked list been read.

13. The Ethernet switching architecture according to claim 12, wherein the second link RAM have an address width no larger than that of the first link RAM.

14. The Ethernet switching architecture according to claim 12, wherein the shared memory have a plurality of blocking data buffers with same size, and the first link RAM and the second link RAM are configured respectively to have a plurality of link address spaces that are the same as the plurality of blocking data buffers in number.

15. The Ethernet switching architecture according to claim 14, wherein the plurality of blocking data buffers have a size of 256 bytes.

16. The Ethernet switching architecture according to claim 14, wherein the shared memory can be filled with the packet segments of a packet of the plurality of packets on a maximum of six blocks.

17. The Ethernet switching architecture according to claim 14, wherein the plurality of blocking data buffers on the shared memory comprises:
  A plurality of blank blocks in a free-buffer pool; and
  A plurality of blocks in the plurality of assigned buffers for writing.

18. The Ethernet switching architecture according to claim 17, wherein the plurality of blocks in the plurality of assigned buffers for writing comprises:
  Blank blocks to be assigned to the packet segments waiting to be received; and
  Blank blocks released after the plurality of blocks of the plurality of assigned buffers for writing have been completely read.

19. The Ethernet switching architecture according to claim 17, wherein the plurality of blank blocks in the free-buffer pool are corresponding to the plurality of link address spaces on the second link RAM.

20. The Ethernet switching architecture according to claim 12, wherein for co-managing an obtaining of the link address spaces at the corresponding input ports before the single linked list been made is to request the second link RAM for at least one free-link address space when the link address spaces counts is less than a fixed count;
  Wherein the free-link address space is corresponding to a usable link address space of the first link RAM.

21. The Ethernet switching architecture according to claim 20, wherein the fixed count is 6.

22. The Ethernet switching architecture according to claim 12, wherein for co-managing a releasing of the link address spaces at the corresponding output ports after the single linked list been read is to insert the link address spaces which have been completely read on the first link RAM to the tail address on the second link RAM in a manner of first in first out order through the second link RAM.

23. The Ethernet switching architecture according to claim 12, wherein a packet of the plurality of packets has a maximum length of 1536 bytes.

24. The Ethernet switching architecture according to claim 12, wherein the shared memory is a SRAM or DRAM.

25. The Ethernet switching architecture according to claim 12, wherein the first link RAM is a SRAM or DRAM.

26. The Ethernet switching architecture according to claim 12, wherein the second link RAM is a SRAM or DRAM.

* * * * *